March 31, 1931. W. J. PETER 1,798,805
LIQUID DISPENSER
Filed July 3, 1929 5 Sheets-Sheet 1

INVENTOR
William J. Peter
BY Bohleber + Ledbetter
ATTORNEYS

March 31, 1931. W. J. PETER 1,798,805
LIQUID DISPENSER
Filed July 3, 1929 5 Sheets-Sheet 2
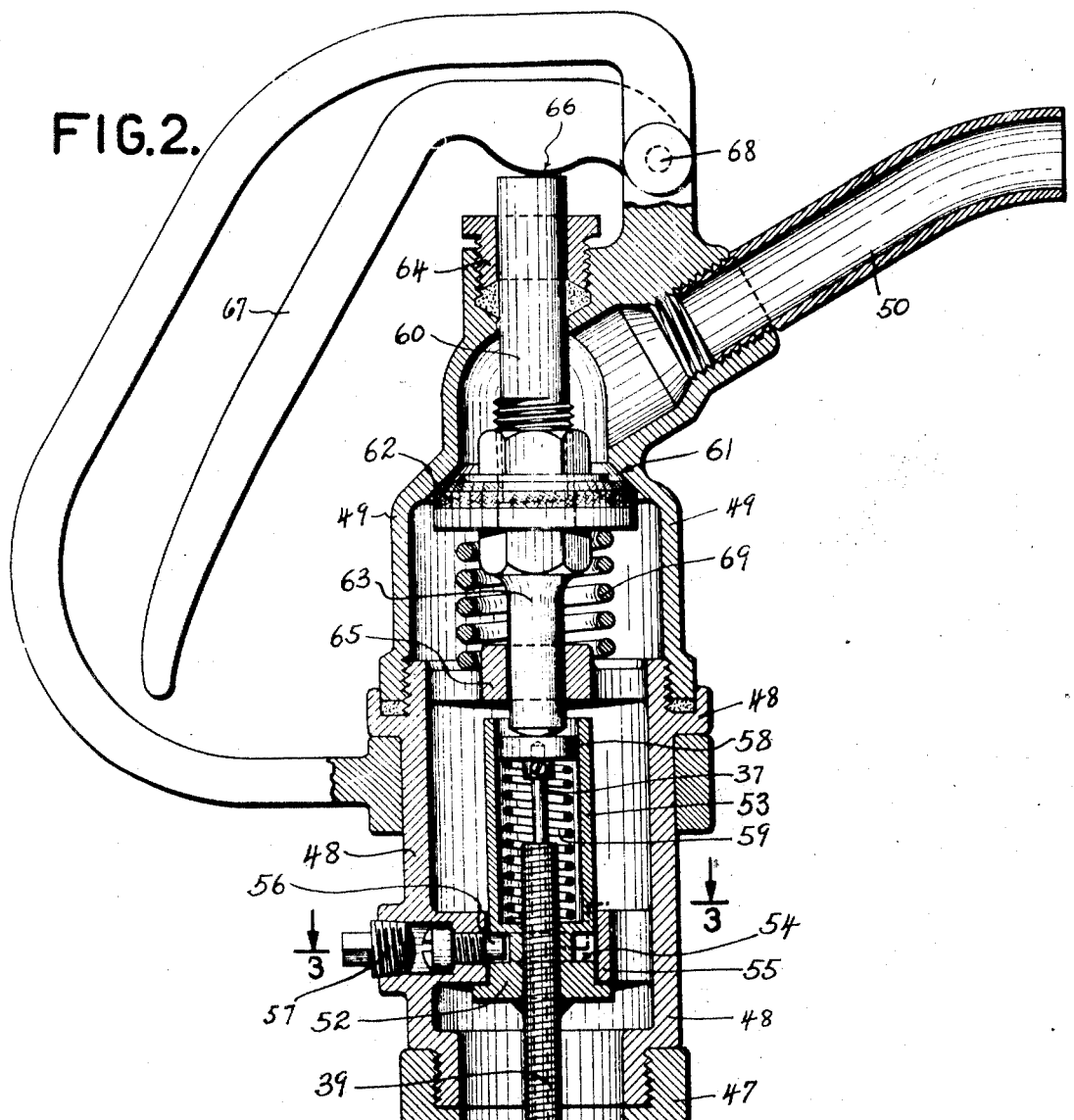
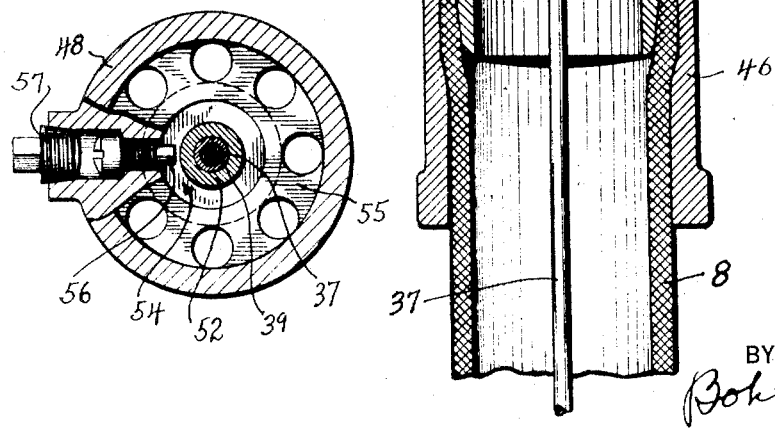
INVENTOR
*William J. Peter*
BY
*Bohleber + Ledbetter*
ATTORNEYS Inventor
William J. Peter March 31, 1931.                W. J. PETER                1,798,805
                             LIQUID DISPENSER
                    Filed July 3, 1929        5 Sheets-Sheet 4
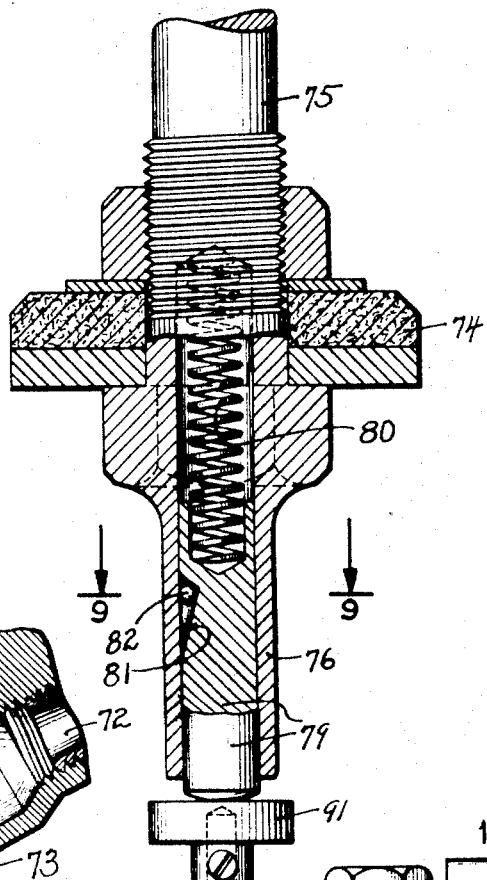
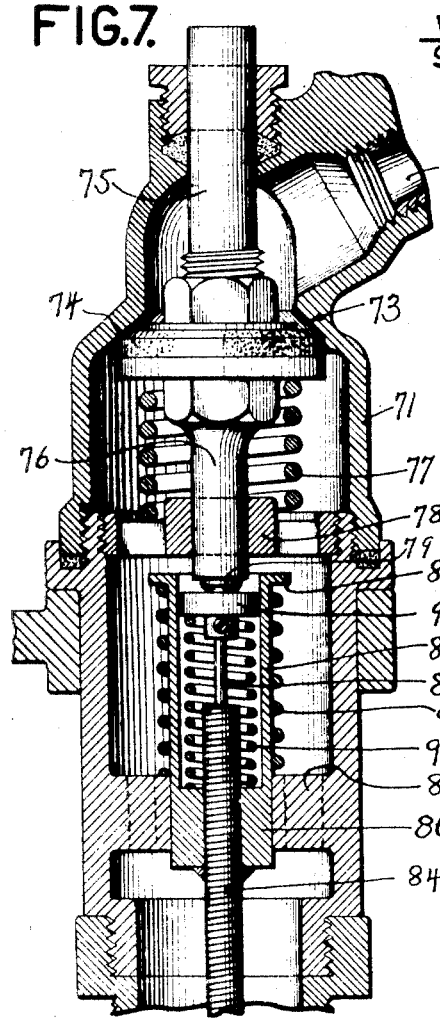
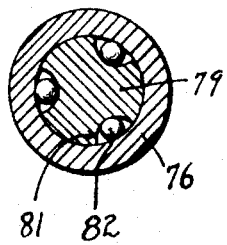
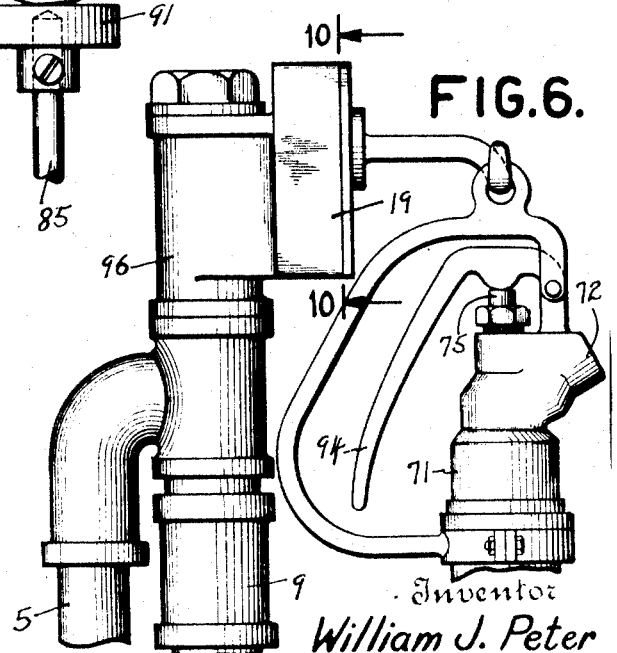
Inventor
William J. Peter
By Bohleber + Ledbetter
Attorneys March 31, 1931.  W. J. PETER  1,798,805
LIQUID DISPENSER
Filed July 3, 1929   5 Sheets-Sheet 5
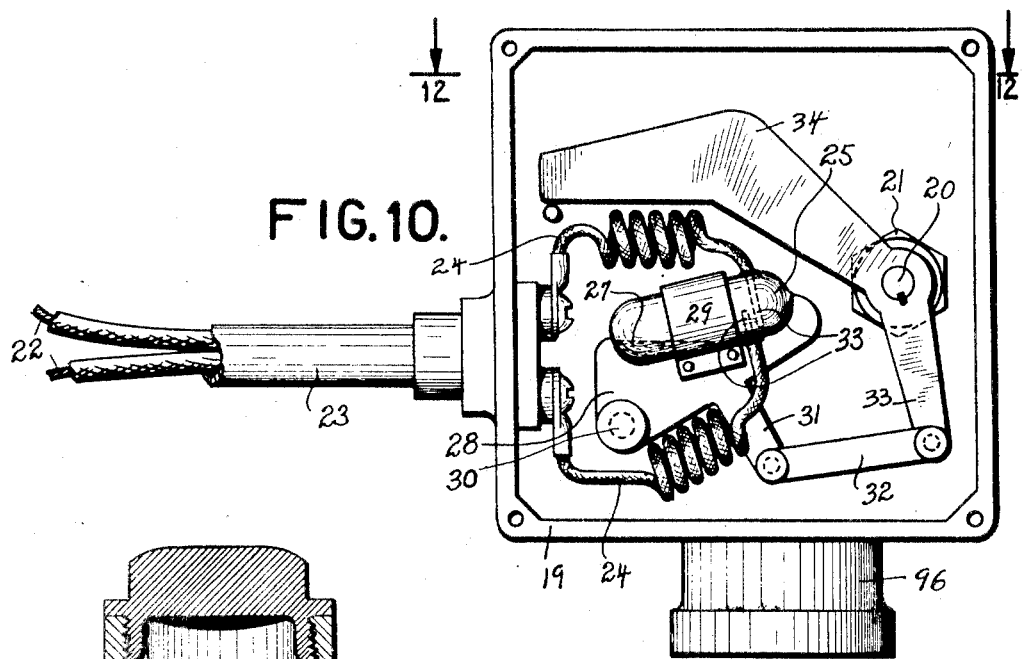
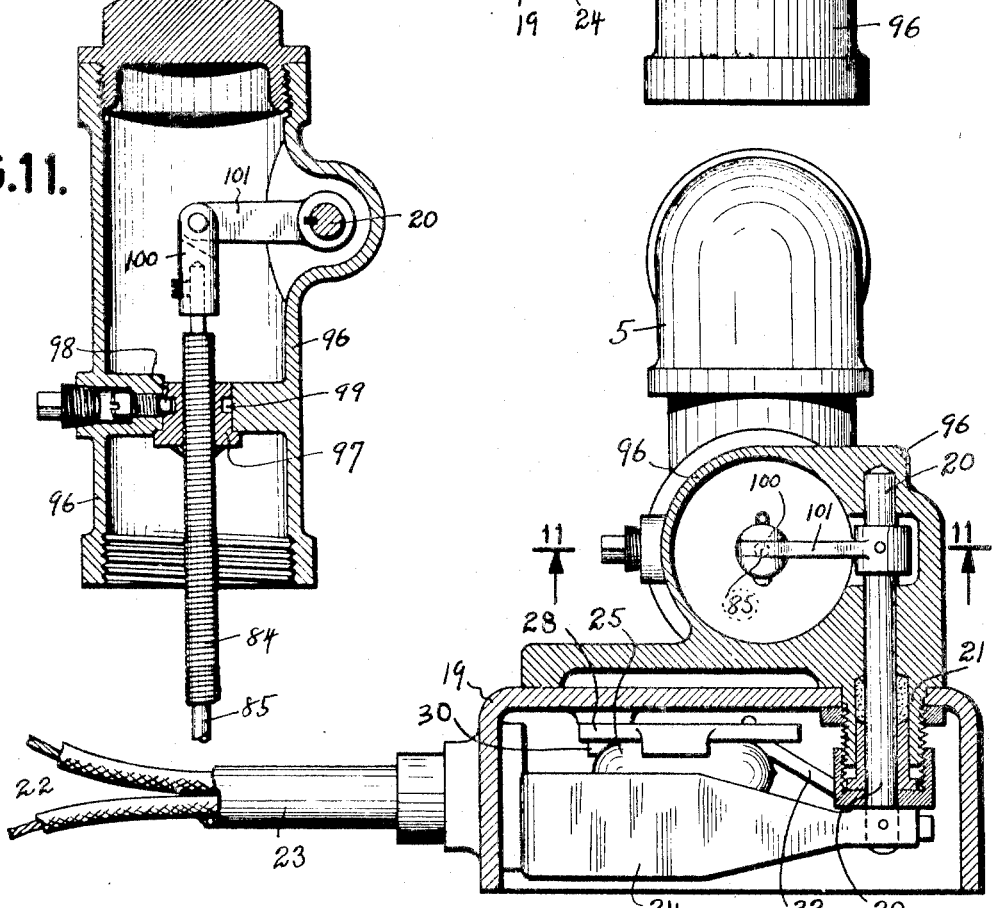
INVENTOR
William J. Peter
BY
Bohleber & Ledbetter
ATTORNEYS Patented Mar. 31, 1931

1,798,805

UNITED STATES PATENT OFFICE

WILLIAM J. PETER, OF NEW YORK, N. Y., ASSIGNOR, BY MESNE ASSIGNMENTS, TO AQUA SYSTEMS INCORPORATED, OF NEW YORK, N. Y., A CORPORATION OF NEW YORK

LIQUID DISPENSER

Application filed July 3, 1929. Serial No. 375,618.

This invention relates to liquid handling and dispensing apparatus such as gasoline, oil or other liquid dispensers, and includes valve or nozzle controlled switches as a new instrumentality in gasoline or other liquid handling and dispensing systems.

An object of this invention is to produce liquid handling, conveying or dispensing apparatus including a combination switch and valve operating means for use in connection with conduits, more particularly flexible conduits, such as gasoline dispensing hose and the like which are connected to curb pumps or other types of dispensing apparatus used largely in and about gasoline and oil filling stations or garages and otherwise in connection with liquid handling systems in laboratories, factories, testing plants and the like.

A further object is to produce improvements in gasoline dispensing hose having a discharge valve nozzle and a circuit control means such as a remotely located switch, and in this connection it is an object to provide novel operative remote control connections or motion-transmitting means between the separated valve and the switch whereby the valve action controls the switch. In this way, a gasoline service station operative or other attendant opens the liquid discharge valve in a conduit, say at the end of a flexible hose, to fill the fuel tank of a motor car and the valve motion operates through a motion-transmitting means to cause a remotely located switch to be actuated, say closed, which in turn closes an electric circuit to initiate operation of any suitable power means or prime mover, such as a pump or hydraulic system, to force gasoline through the hose to fill the tank. Closing the discharge nozzle valve serves to open the switch, thereby stopping the power means force feed and hence removing all flow pressure from the line and hose thus rendering safe the system in all respects.

A further object of this invention is to provide adjustment instrumentalities combined with the motion-transmitting means whereby the latter accommodates itself by adjustment to all manner of changes in position or physical state of the conduit which is usually a flexible one such as a hose. A gasoline hose is subjected to hard usage and in service it will vary in length, principally by elongation as it stretches with age. Means is provided in the operative connections between the discharge valve and remote switch to accommodate this stretching of the hose and to allow fully that natural tendency of the hose to change its physical state and at the same time avoid placing undue strain on the motion-transmitting means or operative connections which are required to work the switch ordinarily mounted at the stationary end of the hose while the discharge valve and nozzle are mounted on the free end of the hose.

Furthermore, it is an object to provide rotary or swiveling adjustment means in the motion-transmitting devices or operative connections for the reason that the hose is frequently twisted or kinked in service, or in any event when a new hose is installed, the screw threaded nipple and hose connections must be removed and replaced to install a new hose. In either event, rotary motion is imparted to the hose or parts of the equipment and it is desirable to avoid rotating, twisting or kinking the motion-transmitting devices carried within the hose and hence this invention provides means for permitting the motion-transmitting devices to remain stationary while a new hose is being installed, and provides swivel means to allow said motion-transmitting devices to rotate in relation to the hose and thereby free itself of torsional strain and kinking tendency when the hose itself is twisted and kinked.

In keeping with the foregoing objects, the invention provides essential adjustment instrumentalities which co-operate with the motion-transmitting remote control means running from the valve to the remotely located switch and interconnecting said valve and switch to afford compensated adjustment in a compound sense, in that said motion-transmitting means accommodates itself, longitudinally, to a change in the length of the flexible hose, and also accommodates itself, rotatably, by remaining substantially stationary when the conduit turns or twists thereabout. This double or compound adjustment feature is noteworthy and contributes to the success of the invention.

A further object is to produce a nozzle or valve controlled switch apparatus for use in connection with flexible hose wherein the motion-transmitting devices to connect the remotely located switch and valve include a plunger like means, such for example as a Bowden wire. Means are combined with this Bowden wire type of motion-transmitting device to vary its length as, for example, elongation thereof in case the hose elongates. Furthermore means are combined with the Bowden wire operating connections to allow rotary adjustment of the flexible hose parts thereabout. In other words, this invention provides a combination Bowden wire elongation means and rotary adjustment means for liquid dispensing hose, the two means working either independently or conjointly with each other, depending upon the motion the hose encounters in service causing it to stretch, or upon due wear or leakage thereof, rendering it necessary to remove the old hose and install a new one, and hence encountering rotary motion.

With the foregoing general objects in view and others, this invention has relation to certain combinations and arrangements of parts, it being understood that changes in construction and mode of operation may be resorted to without departing from the principles of the invention, and one or more concrete embodiments are illustrated in the accompanying drawings by way of example only and wherein:

Figures 1 through 5 show the first form of the invention and which may be referred to as a preferred form of construction.

Figure 1 is an assembly view of a gasoline dispensing hose or other conduit attached to a meter box and gasoline supply line.

Figure 2 is a longitudinal section of the outer free end of the gasoline hose with its discharge valve and nozzle in closed position and in operative connection with a motion-transmitting device which runs through the hose and connects with a remote electrical switch.

Figure 3 is a cross section taken on the line 3—3 of Figure 2 and shows a swivelling means which attaches the Bowden wire to the discharge valve and permits rotary motion between the valve housing and said Bowden wire or other types of motion-transmitting connections.

Figure 4:
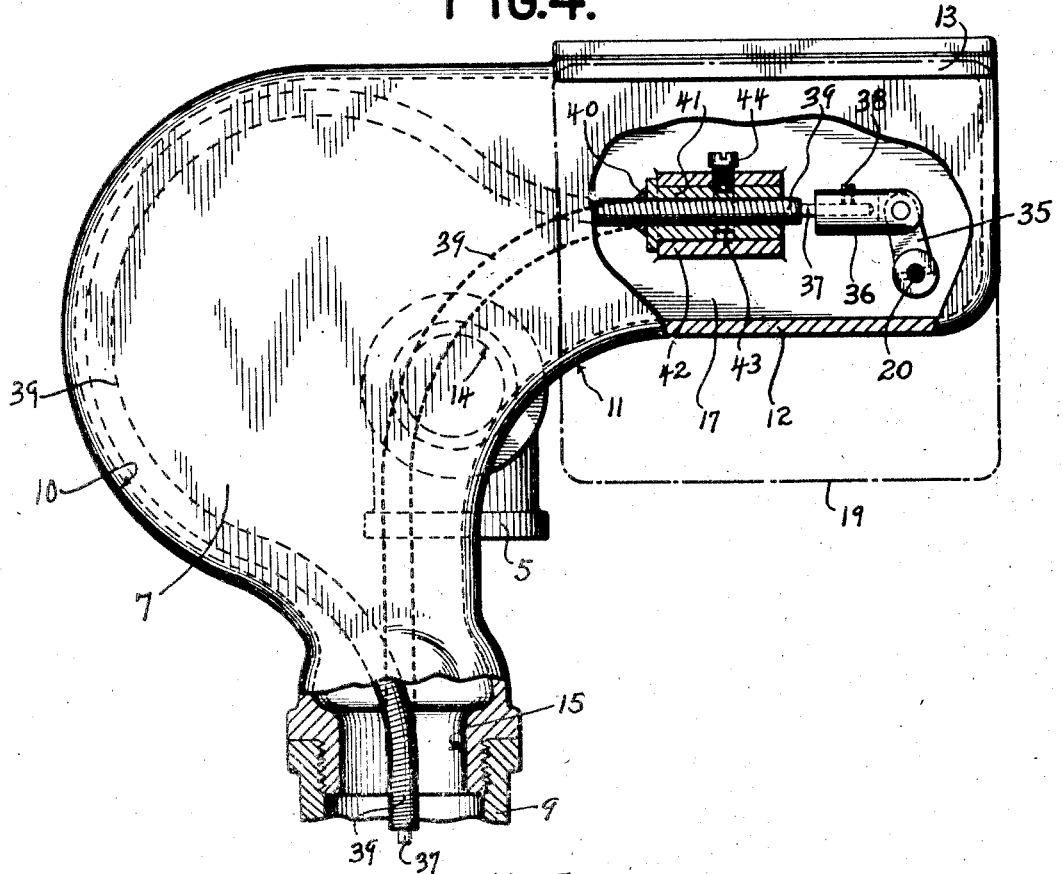
Figure 5:
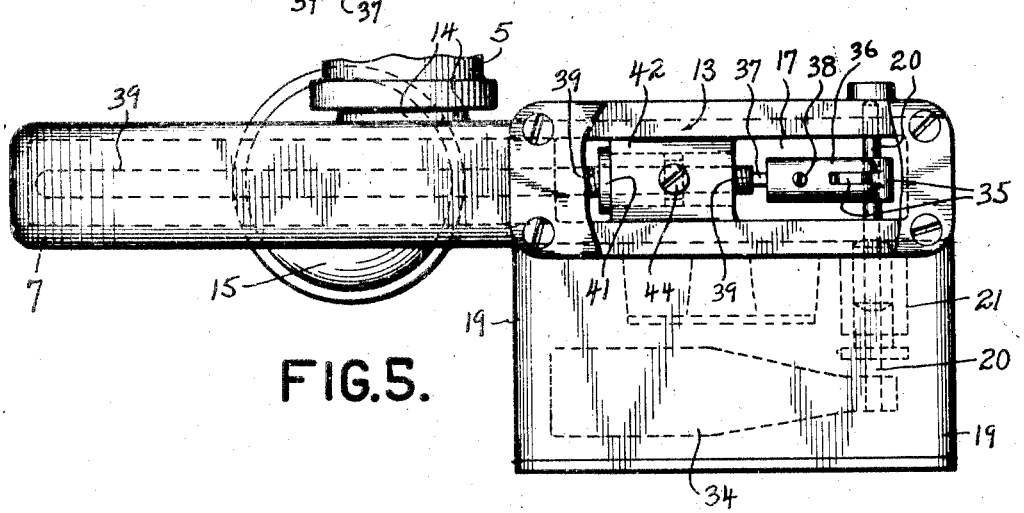

Figures 4 and 5 are side and top views, respectively, of a liquid and Bowden wire receiving chamber adapted to receive gasoline and also to contain an extra length of the motion-transmitting plunger wire. The extra length portion of the Bowden wire pays itself out to accommodate the stretch of the hose and remain operative to work the switch from the valve for any increased length of the hose. This Bowden wire chamber is an example of one form of construction employed to overcome the difficulties encountered in the elongation of a liquid dispensing hose, and from this chamber there is gradually payed out a length portion of Bowden wire equal to the gradual elongation of the hose.

Figures 6 through 12 illustrate a modified form of the invention in respect to the adjustment instrumentalities for accommodating both the hose elongation and rotary displacement of the hose or its parts when the hose is jerked about, pulled and kinked, and otherwise subjected to severe treatment in service and finally rotated to remove it and be replaced by a new hose and during which it is necessary that the operating Bowden wire connections not be rotated in the hose. Otherwise, the switch, the valve and all other parts of the apparatus are substantially the same as shown in the first form of the invention, except the Bowden wire expansion chamber, detailed in Figures 4 and 5, are not required in the second form of construction.

Figure 1:
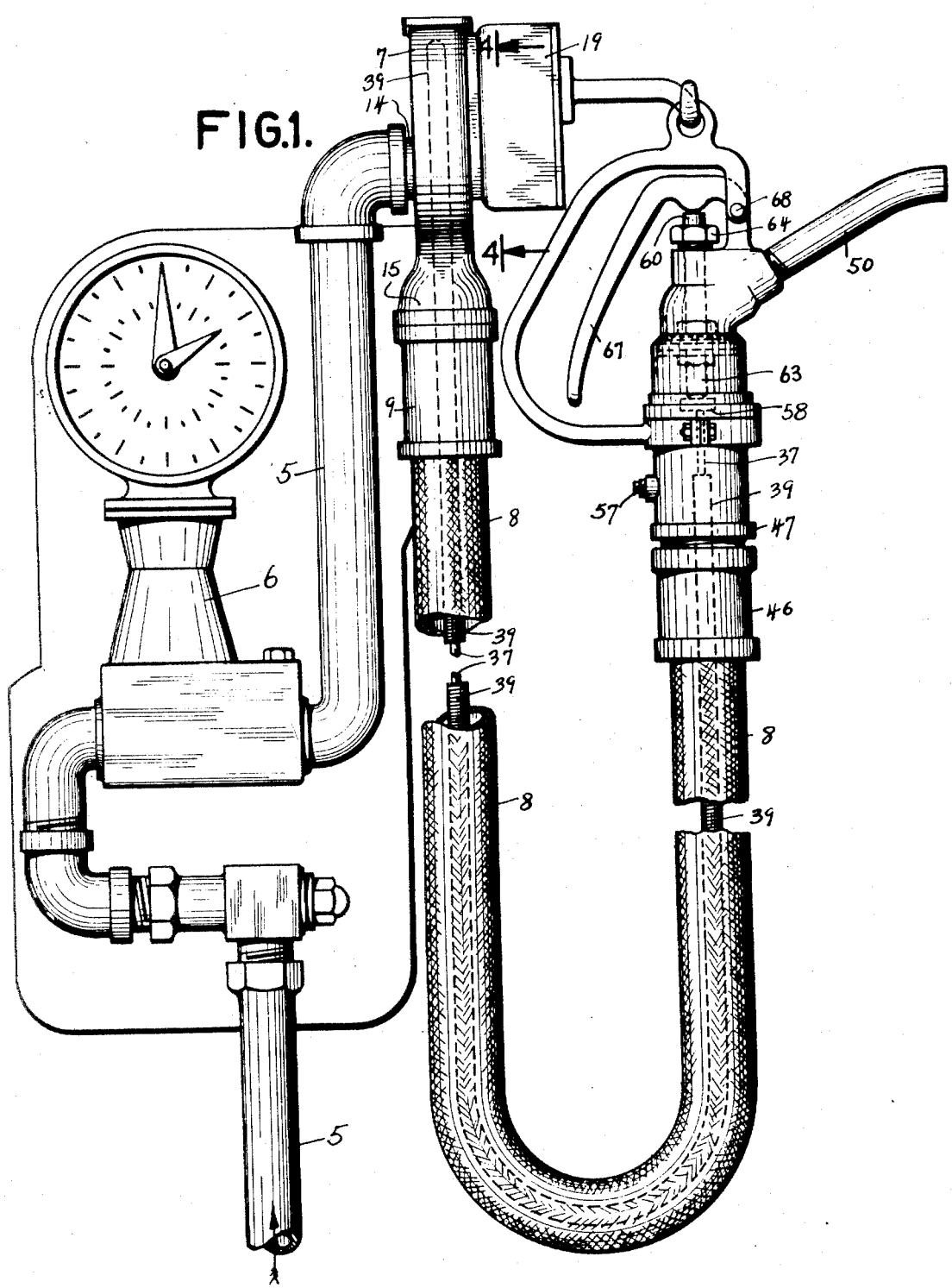

Figure 6 is a fragmentary assembly view of the modified construction showing the discharge valve hanging on the meter and switch box the same as in Figure 1.

Figure 7 is a longitudinal section of the discharge valve and nozzle, modified only in respect to the means for accommodating the Bowden wire to the stretching action of the hose.

Figure 8 is an enlarged sectional view of the discharge valve, the valve stem and disk of which are removed from Figure 7 and enlarged to show a ball clutch extension plunger employed for increasing the effective length of the valve stem when the gasoline hose stretches, rendering it unnecessary for the Bowden wire to correspondingly pay out or elongate with the hose as contemplated in the first form of construction.

Figure 9 is a cross-section on the line 9—9 of Figure 8 showing the ball clutch plunger means which slides or pays out and is effective to extend or elongate the valve stem when released by elongation of the hose but relocks and rigidly stands against a force exerted in the other direction.

Figure 10 is an open view of a switch box at the stationary or meter end of the hose together with the electrical connections used to actuate the switch. In fact Figure 10 is common to both forms of the invention because this same switch box may be used, whether the Bowden wire chamber of Figure 4, or the ball clutch valve stem of Figure 8, or both, are employed.

Figure 11 shows a longitudinal section on the line 11—11 of Figure 12 and illustrates a swivelling anchorage or connection to attach the Bowden wire sheath to the switch box, leaving the Bowden wire plunger free to connect with the switch operating means.

Figure 12 illustrates a plan section on the line 12—12 of Figure 10 and shows the switch operatively connected to the Bowden wire motion transmitting device.

Coming now to a description of the first form of the invention, reference is made to the assembly view Figure 1 wherein a feed pipe 5 for any form of liquid such as gasoline leads through a suitable metering device 6 to measure the liquid, and the pipe 5 runs from the meter to a thin but wide spread chamber 7 where the gasoline runs downwardly through the chamber into a conduit such as a dispensing hose 8 which is attached to the chamber 7 by a sleeve or nipple connection 9. The chamber 7 serves two purposes because it connects the hose 8 with the feed pipe 5 and acts as a compensating or expansion chamber to retain the excess length of Bowden wire or other type of remote control operating connection interposed between the switch and valve to be described.

The Bowden wire and liquid receiving chamber 7 is made with an outward bulge or easy curvature at 10 and the Bowden wire or other type of remote control connection may bulge, loop or swell its extra length portion into the chamber 7 against the wall 10 on an easy curve when the hose apparatus is new, and as the hose 8 stretches the Bowden wire connection pays out into the hose and occupies a position closer to the inner curvature 11 of the chamber 7. The upper end of the chamber 7 may be formed with a lower horizontal extension 12 thereby forming the bottom wall of a housing 17 in which some of the switch operating parts are placed. The housing wall 12 leads off as a tangent from the arcuate inner curved wall 11 of the chamber 7, and an upper wall or housing edge 13 may be substantially tangent to the outer radius defining the chamber wall 10. Between the arcuate walls 10 and 11 is formed the thin chamber 7 offset to one side of and below the housing 17. The inner surface of the wall 10 acts as a rest or stop against which the excess length or loop of the Bowden wire lays on an easy curve when first installed.

The Bowden wire and gasoline receiving chamber 7 is formed of closely spaced parallel side walls bound or joined together by the outer curved wall 10 formed on a long radius and the short inner curved wall formed on a shorter radius. This provides a chamber of rather thin proportions but with a protruding or broad bulging curvature which accommodates the operating connections such as a Bowden wire running from the switch to the remote discharge valve. The feed or inlet pipe 5 connects to the chamber 7 through an inlet connection 14 above a gasoline outlet 15 to which the hose 8 is attached by the connection 9. The outlet 15 is placed below the inlet 14 and below the housing 17 and hence liquid does not reach the later but pours down thru the chamber 7 to the hose 8. The hose outlet 15 is formed between the lower ends of the converging walls 10 and 11 and the housing 17 of restricted size is formed between the upper ends thereof.

A switch box 19 is mounted on the side of the restricted housing 17 and a switch operating shaft 20 is journaled in the box 19 and rocks in a stuffing box 21 which prevents gasoline fumes or other liquid from leaking from the housing 17 into the box 19 should gasoline rise that high. One end of the shaft 20 is disposed in the housing 17 to receive motion imparted thereto from a discharge valve on the outer end of the hose, while the other end of the shaft is disposed in the switch box 19 to operate a switch therein.

Any suitable form of switch mechanism may be housed in the switch box 19 so long as there is provision to make and break an electric circuit indicated by the wires 22 leading through a conduit 23 attached to the box 19. The electrical circuit 22 continues through flexible connections 24 to a tilting switch including a sealed mercury containing tube or bulb 25 which affords one suitable type of switch for this apparatus. The bulb 25 contains mercury 27 and the bulb is attached to a rocker arm 28 by suitable means such as a loop or bracket 29.

The rocker arm 28 is pivoted at 30 on the switch box 19 and is made with an arm 31 to which is pivotally connected a link 32. A weighted lever, including an arm 33 and operating weight 34, is fixed on the rock shaft 20, and the lever arm 33 is pivotally connected to the link 32. The weight 34 acts downwardly to urge the rocker arm in a counter clock-wise direction to maintain the mercury 27 at the left lower end of bulb 25 out of contact with switch points 33 to hold open the electric circuit 22. Since no current flows through the wires 22, an electric motor driven pump or hydraulically operated system, not shown, remains inoperative and no gasoline flows upwardly through the feed pipe 5.

On the other hand, when the rocker arm 28 tilts clockwise downwardly, due to clockwise rotation of the shaft 20, and by overcoming and lifting the weight 34, then the mercury 27 flows to the right end of the switch tube 25 to emerse the switch points 33, thus closing the circuit 22 and starting a mechanical or hydraulic pumping system which forces gasoline through the feed pipe 5 to the hose 8. The switch is tilted clockwise and the weight 34 or other power means is lifted to close the circuit 22 by operation of a mechanism which will now be described. Spring or other switch closing means as a weight 34 performs satisfactorily and may be used, though other types of motor or prime mover means are also useful.

That end of the shaft 20, which projects into the housing 17, carries an arm 35 fixed thereto. This arm 35 is pivotally connected with a socket link 36 in which is anchored one end of a Bowden wire plunger 37 and the anchorage is effected by a set screw 38 or other means. The Bowden wire generally includes a guide casing or flexible sheath 39 through which its plunger 37 reciprocates. The sheath or guide 39 retains the plunger 37 in straight operating position capable of exerting thrust or tension over a long distance. It is desirable to hold the Bowden wire sheath 39 in substantially stationary position so the wire plunger 37 may reciprocate back and forth therein. To this end the Bowden wire sheath 39 is anchored, as by solder or other means 40, in a swivel bushing 41. The bushing 41 is free to turn in a cuff or sleeve 42, the latter being a stationary bearing member attached to or made integral with the closely spaced parallel side-walls forming the narrow restricted chamber 7, though the latter is of wide spread to afford room for the extra length of Bowden wire looped therein as earlier explained.

The stationary cuff 42 and swivel bushing construction 41 is apparent from an inspection of the side view Figure 4 and top view Figure 5. The cuff 42 may be arranged to bridge the narrow distance between the two spaced walls forming the chamber 7 and brace the walls thereof. The bushing 41 is grooved at 43 and a pilot or retaining screw 44 is screw threaded into the sleeve 42 and has a smooth bearing end projecting into the bushing groove 43 which permits swivelling or rotation of the housing 41 in the sleeve 42 but prevents longitudinal displacement of the bushing 41 from its retaining cuff 42. The assembly permits the sheath 39 to freely swivel in the housing 17 so as to free itself of any tendency to twist or become kinked or snarled up in the chamber 7, hose 8 or with other parts of the apparatus.

For example, the hose 8 is usually subjected to rough usage and may become twisted and kinked and is even run over by vehicles. The swivel anchorage bushing 41 allows the Bowden wire sheath 39 to straighten out and free itself of torsional strain and hence avoid gripping or constricting the inner sliding plunger wire 37 so that the latter may reciprocate freely. A thrust imparted to the Bowden wire plunger 37 upwardly through the hose 8 causes the arm 35 to be swung to the right in Figure 4, and correspondingly rotates the shaft 20 in a clock-wise direction, which moves the link 32 to the left in Figure 10, and hence tilts downwardly the right end of the switch bulb 25 in Figure 10 to close the circuit 22 and start the system in operation to pump gasoline through the feed pipe 5.

The Bowden wire 37—39 is looped on an easy curve through the chamber 7 as already mentioned which receives both the Bowden wire and gasoline. The extra length of looped Bowden wire rests against the curved wall 10 as shown in Figure 4. The long easy curve assumed by the Bowden wire permits the plunger wire 37 to run smoothly through the sheath 39 and thru the loop in the chamber 17. The Bowden wire runs down through the outlet 15 and into the hose 8 to the other and free end of the hose on which is mounted a discharge valve and nozzle as will now be explained.

The reference 8 indicates a flexible conduit such as a gasoline dispensing hose but it is understood that other types of conduits may be used in connection with this invention where the principles thereof are adapted to other uses and modifications of this construction. The outer free end of the hose 8 is clamped by a sleeve 46 to a nipple 47 which is screwed onto a valve body or sleeve 48 which carries a valve housing 49 on the outer end thereof and a discharge nozzle 50 is attached to the housing 49. The parts 48 and 49 comprise the main valve body and may be assembled by a threaded connection. In assembling the apparatus and installing a new hose, it is necessary to rotate the valve body and hose parts relatively to each other and because of this action, it is necessary to provide a swivel connection for that end of the Bowden wire 37—39 which co-operates with the valve.

The Bowden wire 37—39 is led into the valve body sleeve 48 and is rigidly connected as by soldering it in a swivel bushing 52 which may include a sleeve 53. The swivel bushing includes a peripheral groove 54 which is rotatably confined in a spider 55, which is integrally formed within the valve body 48. The spider 55 includes perforations thru which liquid flows so that gasoline or other liquid passes freely from the hose outwardly through the valve body and nozzle 50. The composite bushings 52—53 is long enough to form a good bearing surface in the bore of the spider 55 and to provide a longitudinal guide for the wire plunger means as later described. A pilot screw having a smooth head 56 is mounted through the valve body 48 and disposed in the groove 54 of the bushing so the latter freely rotates within its seat formed by the spider 55, but the pilot screw 56 retains the bushing 52 against longitudinal displacement. The pilot screw is usually concealed under a plug 57 to prevent careless tampering with its adjustment once it is properly set. The Bowden wire sheath 39 is firmly anchored as by soldering its end bushing 52 and this wire and bushing assembly is capable of free relative rotation to unwind itself and seek an operative position entirely relieved from torsional strain which might occur due to hard usage and twisting of the hose 8.

The Bowden wire sheath and plunger open into the sleeve 53 and the plunger 37 projects from the Bowden wire sheath. A head or flange 58 is anchored to the extremity of the Bowden wire plunger 37 and reciprocates freely in the bushing sleeve 53. In some cases, a compression spring 59 is mounted in the sleeve 53 between the Bowden wire head 58 and the rotatable bushing 52. The expansion of this spring 59 maintains the plunger 37 in outwardly taut relation thereby removing the slack from the plunger and keeping it outwardly against a valve stem, as will be described.

The valve housing 49 is made with a passage 61 which is opened and closed by a valve disk 62 carried on the central portion of a valve stem 60—63 which has its outer end 60 guided at one end through a packing gland 64 and has its inner end 63 guided in the bearing of a perforated spider 65. The outer valve stem end 63 is exposed at the end of the valve body and is engaged by the cam surface 66 of a handle 67 pivoted at 68 by pressing the handle 67 toward the valve body. The cam 66 forces inwardly on the valve stem 63 to unseat the valve disk 62 and open the passage 61 whereupon gasoline flows from the hose 8 outwardly through the nozzle 50.

A valve seating spring 69 is usually interposed between the spider 65 and valve disk 62 and the expansion of this spring normally holds closed the valve elements 61—62 against the flow of gasoline. The inner end 63 of the valve stem engages the Bowden wire plunger head 58 and the spring 59 in the sleeve 53 holds the head 58 in engagement with the extremity of the valve stem 63. The motion of the handle 67 is transmitted through the valve stem 60—63 to the remote control plunger 37 to exert pressure thereon and slide the same downwardly through the Bowden wire sheath 39. In this way, the wire plunger 37 reciprocates throughout the length of the hose toward the switch mechanism at the other end of the hose. The plunger travels through the looped extra length portion of the Bowden wire in chamber 7 and imparts a clock-wise rotation to the shaft 20 in Figure 4 which in turn lifts the weight 34 and tilts the switch bulb 25 to the right in Figure 10, thereby causing the mercury 27 to flow over the contact points 33 immersing the latter and closing the circuit through the wires 22, which starts operation of an electric motor, and initiates the flow of a hydraulic system or other means to pump gasoline through the hose 8.

Reference is now made to the second form of the invention shown in Figures 8 through 12, including Figure 10, which is a switch-box useful in both forms of construction. This second form of the invention is merely another example of adjustment or compensating means to accommodate the remote control Bowden wire to the unavoidable elongation occurring in the hose due to service. The means here provided comprises an extensible ball clutch plunger which pays out in length a distance equal to the elongation of the hose, and the plunger includes means to prevent it from receding in the other direction or backing up when a force is brought thereagainst.

In Figures 6 and 7 there is shown a discharge valve nozzle similar to that shown in Figures 1 and 2 except that the former views contain the extensible ball clutch plunger rendering it unnecessary to employ the enlarged Bowden wire and liquid receiving chamber 7 shown in the first form of the invention. It is observed that Figure 6 does not include the Bowden wire chamber 7 as shown in the assembly view Figure 1 since the use of the ball clutch valve plunger shown in Figure 8 renders the chamber 7 unnecessary.

The discharge valve in Figure 7 comprises a valve housing 71 having a discharge nozzle 72 shown broken off and a valve passage 73 which is opened and closed by a valve disc 74. The valve disc 74 is carried on a reciprocating plunger 75—76, the lower end 76 being guided in a spider 78. A valve closing spring 77 is interposed between the valve disc 74 and the spider 78 to hold the valve 73—74 in normally closed position. This discharge valve is about the same in general construction as that shown in Figure 2.

The lower end 76 of the valve stem is made tubular in form as shown in Figure 8 and a piston like plunger 79 is slidably carried in the valve stem tube 76. A spring 80 is interposed and expands between the inner end of the plunger 79 and the bottom of the tube 76 with the result that the spring 80 continuously urges outwardly on the plunger 79 maintaining the outer end thereof in engagement with the movable end of the Bowden wire plunger, as will be explained. This pay out or expanding plunger is made with ball pockets 81 with their deepest portion formed uppermost in the plunger and their tapering wedge like walls feather out toward the internal surface of its containing tube 76. One or more of these ball pockets 81 are formed in the plunger 79 and a ball 82 is loosely confined therein.

The result is that the plunger 79 moves outwardly by the spring 80 and the balls 81 move freely along the wall of the tube 76 to follow the gradual outward creeping motion of the plunger 76. On the other hand, if the plunger 79 receives a force in the other direction opposing the spring 80, it will not move upwardly in the valve stem or back up because the balls 82 lock in the pockets 81 and hence prevent reverse movement of the plunger 79. Such increased overall length as may be gained by the outward creeping motion of the ball-clutch plunger is never lost because the balls wedge in the pockets and will not allow the plunger to go back into the tube.

A Bowden wire 84—85 as already described in the first form of the invention, includes a sheath 84 and a plunger 85 moving freely in the sheath. The sheath 84 is soldered or otherwise anchored in a swivel bushing 86 rotatably confined in a spider 87 formed in the valve housing. The bushing 86 is free to both rotate and reciprocate in the spider 87 and includes a sleeve 88 having a flange 89 on the upper end thereof. A coil spring 90 is interposed between the spider 87 and flange 89 to move the bushing 86 upwardly toward the valve stem plunger 79 and thus maintain the Bowden wire sheath 84 under tension to keep it taut and in outstretched operative condition to avoid kinks occurring therein. A plunger head 91 is anchored to the extremity of the Bowden wire plunger 85 and is free to reciprocate in the guide sleeve 88. A coil spring 92 is confined inside the guide sleeve 88 between the plunger head 91 and the bushing 86 and exerts an outward pull on the plunger 85 always maintaining its head 91 in operative engagement with the pay-out ball clutch plunger 79.

It is seen that upon stretching of the hose, the Bowden wire 84—85 remains the same in length and hence tends to move downwardly away from the valve stem 76—79 because the entire valve casing 71 moves outwardly away from the meter box due to the gradual elongation of the hose. As the valve plunger 76—79 moves away from the wire plunger head 91 the pay-out plunger spring 80 feeds the length adjustment plunger 79 outwardly to increase the overall length of the valve stem 75—76—79 thus maintaining a rigid mechanical connection between said valve stem as operation is effected of a valve control handle 94 which is in constant engagement with the Bowden wire plunger 85 and head 91. Hence the stretching of the hose does not render inoperative the remote control means of the dispensing apparatus because the pay-out plunger 79 moves outwardly to always maintain rigid engagement with the Bowden wire plunger. The position shown for the ball-clutch plunger 79 is a mere example to illustrate its principle. It might be located elsewhere, for example at the switch box, or within the bushing sleeve 88.

Having described the discharge valve end of the second form of the apparatus, the meter box or stationary end thereof will now be considered. A pipe cap fitting 96 is shown in Figures 6, 10, 11 and 12 of appropriate construction to surmount the gasoline supply line 5 rising from a meter or other source and support the switch box 19 carrying the switch 25 already described as being opened and closed by a shaft 20 rocked in one direction by the weight 34 and in the other direction by the remote control plunger 85.

The fitting 96 really supplants the chamber 7 and hence the Bowden wire 84—85 leads straight into the fitting without an extra length portion. The sheath 84 is anchored in a swivel bushing 97 held in place by a screw 98 fitting in a groove 99. The Bowden wire casing 84 is therefore free to rotate at this end as well as the other. The plunger 85 is attached to a coupling 100 which is pivotally connected to an arm 101 which is fixed on the shaft 20. This manner of connecting the Bowden wire to the switch box mechanism in the second form of the invention affords the principal changes in parts which may be required when the chamber 7 is not used.

It is seen that the Bowden wire 84—85 may be swivel connected at both ends to wit, by bushings 97 and 86, the latter being free to slide, longitudinally, and adjust itself, rotatably, and thus adjust in a compound sense, for hose elongation and rotation. The expansion spring 90 places tension on the sheath 84 and hence pulls on the bushing 86, while the other expansion spring 92 tauts the plunger 85 and places a downward tension on the switch arm 101. Thus all slack and lost motion is avoided.

When the discharge valve handle 67 or 94 is depressed, the valve passage 61 or 73 is directly opened by pressure of the handle, and simultaneously the switch 25 is closed to start the operation of a motor driven pump, a hydraulic system or other means, for delivering liquid through the system into the discharge hose 8 and hence to a tank being filled. Upon release of the valve handle, the discharge valve on the outer free end of the hose is closed and simultaneously the pumping of gasoline is discontinued which removes all pressure from the system and there only remains a small quantity of liquid in the hose 8, the stationary end of which is mounted at a high point so that any leakage occurring is limited to the small quantity of gasoline contained in the hose 8. Therefore the system is convenient and safe to operate.

Two forms of the invention have been described and it is evident that either may be adapted for use. The second form is presented as an alternate design of construction which falls within the general principles of the invention.

What is claimed is:

1. In liquid dispensing apparatus, a conduit, an electrical switch and discharge valve disposed in spaced relation and cooperating with the conduit, a motion-transmitting device connecting the spaced switch and valve and including a mechanical connection comprising a plunger-like means and a guide in which the latter reciprocates, and instrumentalities cooperating with the plunger-like means to afford automatically compensated adjustment therefor in relation to the switch and valve.

2. In liquid dispensing apparatus, a conduit, an electrical switch and discharge valve disposed in spaced relation and cooperating with the conduit, a motion-transmitting device connecting the spaced switch and valve and including a mechanical connection comprising a plunger-like means and a guide in which the latter reciprocates; and instrumentalities cooperating with the plunger-like means and with the switch and with the valve to afford compensated adjustment thereof in a compound sense, in that the plunger-like means accommodates itself, longitudinally, to a change in length of the conduit, and also accommodates itself, rotatably, by remaining substantially stationary in case the conduit turns or twists thereabout.

3. In liquid dispensing apparatus, a flexible conduit, an electrical switch and discharge valve disposed in spaced relation and cooperating with the flexible conduit, a motion-transmitting device connecting the spaced switch and valve and including a mechanical connection comprising a plunger-like means and a guide in which the latter reciprocates, means attaching the motion-transmitting device to the switch and valve, and means cooperating with the motion-transmitting device to accommodate any change in length occurring in the flexible conduit.

4. In liquid dispensing apparatus, a conduit, an electrical switch and valve disposed in spaced relation and cooperating with the conduit, motion-transmitting means connecting the spaced switch and valve; and instrumentalities cooperating with motion-transmitting means to afford compensated adjustment thereof in a compound sense, in that said motion-transmitting means accommodates itself, longitudinally, to a change in length of the conduit, and also accommodates itself, rotatably, by remaining substantially stationary when the conduit turns or twists thereabout.

5. In liquid dispensing apparatus, a conduit, an electrical switch and valve disposed in spaced relation and cooperating with the conduit, motion-transmitting means connecting the spaced switch and valve; and instrumentalities including a chamber through which the motion-transmitting means extends to afford a length adjustment and take up means, whereby an extra portion of the motion-transmitting means is operatively housed, and which extra portion pays out to accommodate the gradual elongation of the conduit.

6. In liquid dispensing apparatus, a flexible conduit, an electrical switch and discharge valve disposed in spaced relation and cooperating with the flexible conduit, a motion-transmitting device connecting the spaced switch and valve and including a mechanical connection comprising a plunger-like means and a guide in which the latter reciprocates, and a swivel connection to attach the plunger-like means and the guide to the apparatus whereby a rotary adjustment action takes place between the flexible conduit and motion-transmitting means to prevent the latter from twisting and pinching as the conduit is moved about incident to its installation and service.

7. In liquid dispensing apparatus, a flexible conduit, an electrical switch and discharge valve disposed in spaced relation and cooperating with the flexible conduit, a motion-transmitting device connecting the spaced switch and valve and including a mechanical connection comprising a plunger-like means and a guide in which the latter reciprocates, a swivel connection to attach the plunger-like means and the guide to the apparatus whereby a rotary adjustment action takes place between the flexible conduit and motion-transmitting means to prevent the latter from twisting and pinching as the conduit is moved about incident to its installation and service; and means cooperating with the motion-transmitting device to accommodate any variation in the length of the flexible conduit, whereby if the conduit changes its length, the last named means pays out or takes in an equivalent portion of the motion-transmitting means so the latter is not strained or kinked.

8. In liquid dispensing apparatus, a flexible conduit through which the liquid is conveyed, a discharge valve at one end thereof, a switch at the other end thereof, a guided plunger wire carried inside the conduit and connecting the switch and valve in operative relation, a handle to simultaneously work the valve and guided plunger means and hence the switch; and thin, broad, curved-wall chamber disposed adjacent the switch through which the wire extends and in which an excess portion of wire is housed to be payed out as the conduit stretches.

9. In liquid dispensing apparatus, a flexible conduit, a discharge valve and nozzle at one end thereof, an electrical switch at the other end thereof, motion-transmitting means interconnecting the valve and switch for simultaneous operation, a swivelled anchorage device to which one end of the motion-transmitting means is attached, said device being provided with an external groove, and a fixed pilot screw projecting into the groove to allow complete freedom of rotation of the device at all times but restrain the device from longitudinal displacement.

10. In liquid dispensing apparatus, a conduit through which the liquid is conveyed, a discharge valve at one end thereof, a switch at the other end thereof, a guided plunger means carried inside the conduit and connecting the switch and valve in operative relation, a handle to simultaneously work the valve and guided plunger means and hence the switch, and instrumentalities cooperating with the guided plunger means to maintain the latter in working relation with the handle despite any increase in length of the conduit.

11. In nozzle valve controlled switch apparatus, a chamber into which liquid pours and to which one end of a hose is attached to dispense liquid therefrom, a Bowden wire sheath and plunger carried in the hose and extending into the chamber, anchorage means to attach one end of the sheath in stationary position in the chamber and leaving an extra portion of the Bowden wire movable free therein for movement outwardly into the hose, a switch and operative connections therefrom to the plunger, and a discharge nozzle and valve at the other end of the hose and to which the Bowden wire is operatively connected.

12. Nozzle valve switch apparatus as defined in claim 11, characterized by a swivel device which is included in the anchorage means whereby the Bowden wire is free to rotatably adjust and relieve itself of torsional strain.

13. In a valve nozzle controlled switch, a Bowden wire sheath and plunger having an end disposed in a horizontal position, operating means connecting the plunger to the switch, a chamber having an enlarged portion directed away from the operating means and switch and the Bowden wire being looped on an easy curve for free movement in the enlarged portion, said chamber having a lower outlet to which a hose is attached and the Bowden wire being extended from its loop through the outlet and into the hose and adapted to pay outwardly into the hose as the latter stretches, and a valve and discharge nozzle carried on the other end of the hose and to which the Bowden wire is operatively connected.

14. Apparatus of the form defined in claim 13, wherein the chamber comprises closely spaced parallel walls between which the Bowden wire is loosely confined and extended on its easy curve, an outer closing peripheral wall formed on a curve and joining the parallel walls and against which the Bowden wire rests in its freely curved position when first installed, said closing wall terminating at the lower outlet, and an inner closing peripheral wall joined to the parallel walls and formed on a curve of shorter radius than the outer wall and toward which the Bowden wire loop moves as its easy curve shortens due to the stretching of the hose.

15. In valve and nozzle controlled switches for liquid dispensing apparatus, a housing in which the switch is mounted, a chamber adjacent the housing, a shaft journalled in the housing and operatively connected with the switch and the shaft being extended into the chamber, an operating Bowden wire comprising a sheath and plunger having its end disposed in the chamber, the plunger being connected to the shaft and swivel means attaching the sheath to the chamber, a hose having one end connected to the chamber and the Bowden wire leading from the chamber into the hose, and a discharge nozzle and valve on the other end of the hose and to which the Bowden wire is operatively connected.

16. In nozzle controlled switch apparatus for liquid handling systems, a housing and a switch therein, a Bowden wire to operate the switch, a liquid receiving chamber formed of closely spaced parallel walls bounded by two curved walls of long and short radius thereby providing a space to receive liquid and to receive an extra length portion of the Bowden wire which is curved in the chamber, an inlet pipe connected to the chamber, an outlet hose having one end connected to the chamber and the Bowden wire extending into the hose, a valve attached to the hose including means to open and close the valve, and connections operatively connecting the Bowden wire to the valve and its opening and closing means.

17. In hose apparatus for liquid handling systems, a chamber having a downwardly directed reduced portion forming an outlet to which a hose is attached and having an upper horizontally directed reduced closed portion, an enlargement formed in the chamber between the two reduced portions, a liquid inlet connected to the chamber between the reduced portions, a Bowden wire extending through the chamber from its upper portion and disposed on an easy operating curve through the enlargement and directed outwardly through the liquid outlet and into the hose, switch operating means connected to the Bowden wire in the upper closed chamber portion, and valve means carried by the hose and to which the Bowden wire is operatively connected.

18. In valve controlled means for liquid handling apparatus, a housing in which switch operating means is installed, a Bowden wire entering the housing and including a sheath and plunger, a bearing formed in the housing and in which a bushing is rotatably carried, the sheath being anchored in the bushing whereby the sheath may swivelly in the bearing and relieve itself of torsional strain, the plunger being connected to the switch operating means, a liquid and Bowden wire receiving chamber connected with the housing and into which the Bowden wire is disposed in a free manner on an easy curve, said chamber having an outlet to which a hose is connected and an inlet pipe to convey liquid to the chamber and hence to the hose, valve means in the hose, and means connecting the Bowden wire with the valve means.

19. Nozzle controlled switches having a dispensing conduit and valve, a Bowden wire including a plunger and sheath carried by the conduit and operatively connected with the valve, a chamber having a bearing sleeve and in which the Bowden wire is carried, a bushing rotatably mounted in the bearing sleeve and means retaining the bushing against longitudinal displacement, the sheath being fixed in the bushing and thereby adapted to rotatably free itself of torsional strain, a switch and operating connections therefor, and the plunger being attached to the operating connections to work the switch.

20. Nozzle controlled switches having a dispensing conduit and valve, a Bowden wire including a plunger and sheath carried by the conduit and operatively connected with the valve, a chamber formed of closely spaced walls and in which the Bowden wire is carried, a bearing sleeve carried by and disposed between the walls of the chamber, a bushing rotatably mounted in the bearing and means carried by the bearing engaging the bushing to retain the latter against longitudinal displacement, a switch, the sheath being anchored in the bushing, and the plunger extending through the bushing and operatively connected to the switch.

21. Nozzle controlled switches having a dispensing conduit and valve, a Bowden wire including a plunger and sheath carried by the conduit and operatively connected with the valve, a chamber having a bearing sleeve and in which the Bowden wire is carried, said chamber including closely spaced parallel walls and an outer curved wall thus providing a narrow and wide internal space, the Bowden wire being disposed within the chamber space and held therein to an easy curved operative position between the spaced walls and resting against the outer curved wall, said bearing sleeve being located outside of the circumference of the curved wall and integrally formed in the chamber between its closely spaced walls, a bushing including a peripheral groove mounted in the sleeve, a pilot screw mounted in the sleeve and projecting into the groove, means anchoring the end of the sheath in the bushing, and the end of the plunger being extended through the bushing and projecting from the sheath, and a switch operatively connected with the plunger end.

22. Nozzle controlled switch means having a dispensing conduit and valve means in spaced relation, reciprocable plunger means in the conduit and operatively interconnected between the switch and valve, a chamber interposed between the switch and valve and to which the conduit is connected and through which the plunger means is operatively extended, said chamber including an arcuate support and the plunger means being looped to provide an extra length portion which initially rests against said arcuate support, the switch and operating means therefor being disposed outside the circumference of the arcuate support and looped plunger means, and the chamber being provided with an outlet through which the plunger means enters the conduit and to which said conduit is connected, said outlet also being disposed outside the circumference of the arcuate rest and looped plunger means.

23. In liquid dispensing apparatus; a chamber having a lower outlet, said chamber being of thin but wide formation, including an outer arcuate closing wall straightening out substantially on a tangent from the upper portion of said arcuate wall, and including an inner and shorter arcuate closing wall which also straightens out substantially tangentially from the upper portion of said shorter wall, said two tangent chamber walls having their one ends leading off from the upper chamber portion at a point above the outlet and extending in the same general direction to form a housing which opens into the chamber, closely spaced upright parallel walls carried on the walls aforesaid and closing the chamber and the housing, the outlet aforesaid being formed below and off-side the housing by converging the other ends of the arcuate walls and providing a conduit connection thereon, said chamber being provided with a liquid outlet disposed below the housing and above the outlet; a conduit attached to the connection at the outlet, liquid control valve means carried by the conduit, a switch box mounted on the side of the housing and a switch installed in the box, switch operating means in the housing and in the box and being interconnected, and a motion-transmitting device carried in the conduit and operatively connecting the switch and valve means and extending through the outlet into the chamber and looped therein on an easy curve to afford an extra length portion and reaching into the housing and connected with the switch operating means.

24. In liquid dispensing apparatus, a hose, a discharge valve carried at one end, a switch, and a motion-transmitting device operatively connecting the switch and valve; means carried by the valve and cooperating with the motion-transmitting device to afford free relative motion between said motion-transmitting device and hose so either may be turned without twisting the motion-transmitting device, and means cooperating with the hose and motion-transmitting device to afford elongation in the device to accommodate the gradual stretching of the hose.

25. In liquid dispensing apparatus, a hose, a discharge valve carried at one end, a switch, and a motion-transmitting device operatively connecting the switch and valve; means carried by the valve and cooperating with the motion-transmitting device to afford free relative motion between the latter and hose so either may be turned without twisting the motion-transmitting device, means cooperating with the hose and motion-transmitting device to afford elongation in the device to accommodate the gradual stretching of the hose, and means to tension the motion-transmitting device to maintain it taut as the hose stretches.

26. In liquid dispensing apparatus, a hose, a discharge valve carried at one end, a switch, and a motion-transmitting device operatively connecting the switch and valve; means carried by the valve and cooperating with the motion-transmitting device to afford free relative motion between the latter and hose so either may be turned without twisting the motion-transmitting device, means cooperating with the hose and motion-transmitting device to afford elongation in the device to accommodate the gradual stretching of the hose, said device including plunger means, and a spring cooperating with the plunger means to continuously tension the plunger to hold it in taut operating condition.

27. In liquid dispensing apparatus, a hose, a discharge valve carried thereby, means to actuate the valve, a switch spaced from the valve, a Bowden wire sheath and reciprocating plunger carried in the hose and operatively connected to the switch, a swivel bushing mounted in the valve, the sheath being anchored in the bushing and the plunger extended through the bushing, and means operatively connecting the plunger with the means to actuate the valve.

28. In liquid dispensing apparatus, a hose, a discharge valve carried thereby, means to actuate the valve, a switch spaced from the valve, a Bowden wire sheath and reciprocating plunger carried in the hose and operatively connected to the switch, a swivel bushing mounted in the valve, the sheath being anchored in the bushing and the plunger extended through the bushing, means operatively connecting the plunger with the means to actuate the valve, said bushing being provided with a groove, and means confined in the groove to afford free rotary motion of the bushing but to hold the bushing against longitudinal displacement.

29. In liquid dispensing apparatus, a hose connected to a liquid supply, operating means cooperating with the liquid supply to admit of a flow of liquid through the hose, plunger means in the hose and being connected to the operating means to actuate the latter, a valve including a stem and an operating handle therefor carried on the hose, and means including a rotatable bushing having a groove and pin means operatively connecting the plunger and stem together whereby the motion of the valve is used to reciprocate the plunger means through the hose, and means to elongate the plunger means as the hose stretches.

30. In liquid dispensing apparatus, a hose connected to a liquid supply, operating means cooperating with the liquid supply to admit of a flow of liquid through the hose, plunger means in the hose and being connected to the operating means to actuate the latter, a valve casing including a discharge passage and nozzle and a valve disk to open and close the passage, a handle means to work the disk, a grooved bushing rotatably mounted in the valve casing, a retaining means engaging the grooved bushing, a guide in which the plunger means is carried, said guide being fixed to the rotatable bushing, the plunger means projecting through the bushing and from the guide, a head attached to the plunger means, and tensioning means pulling on the plunger means to hold the head in operative relation with the valve disk and handle means.

31. In liquid dispensing apparatus, a liquid supply and a hose having one end connected thereto, operating means cooperating with the liquid supply to admit of a flow of liquid through the hose, a Bowden wire including a guiding sheath and a plunger in the hose and connected with the operating means to work the latter, a discharge valve on the other end of the hose and a movable part to open and close the valve, a bushing rotatably mounted in the valve and means to retain the bushing against longitudinal displacement; a sleeve carried on the bushing, the guiding sheath being fixed in the bushing and the plunger projecting through the bushing and from the sheath into the sleeve, a head attached to plunger and movable in the sleeve, and a spring in the sleeve expanding against the head to tension the plunger and keep it taut and to hold the latter against the movable part of the valve.

32. In liquid dispensing apparatus as defined in claim 31, characterized by elongating means automatically extending itself as the hose stretches to maintain the movable part of the valve and the head on the plunger in operative relation.

33. In liquid dispensing apparatus, a flexible hose, liquid supply means at one end, a discharge valve and handle to open and close it at the other end of the hose, a Bowden wire sheath and plunger operatively connecting the valve and its operating handle with the liquid supply means so that movement of the handle starts operation of the supply means; and a compound acting adjustment means, installed at one end of the hose, to pay out additional length to maintain the Bowden wire in operative connection with the valve and handle and with the supply means during the stretching of the hose, and to afford rotation of the valve and handle in relation to the Bowden wire to facilitate hose replacement and to avoid twisting the Bowden wire in the hose.

34. In liquid dispensing apparatus, a conduit, an electrical switch and discharge valve disposed in spaced relation and cooperating with the conduit, a motion-transmitting device connecting the spaced switch and valve and including a mechanical connection comprising a plunger-like means and a guide in which the latter reciprocates, anchorage instrumentalities including swiveling means attaching the motion-transmitting device to the valve, a pilot screw and groove means included in the swiveling means, the valve being provided with a socket in which the screw is disposed, and a plug to close the socket and conceal the screw therein.

35. In liquid dispensing apparatus, a conduit through which the liquid is conveyed, a discharge valve at one end thereof, a switch at the other end thereof, a guided plunger wire carried inside the conduit and connecting the switch and valve in operative relation, handle means to simultaneously work the valve and guided plunger wire and hence the switch, and swivel means proximate each end of the guided plunger wire operatively connecting the latter with the valve and switch whereby the conduit may rotate without twisting the guided plunger wire.

36. In liquid dispensing apparatus, a conduit through which the liquid is conveyed, a discharge valve at one end thereof, a switch at the other end thereof, a guided plunger wire carried inside the conduit and connecting the switch and valve in operative relation, handle means to simultaneously work the valve and guided plunger wire and hence the switch, swivel means proximate each end of the guided plunger wire operatively connecting the latter with the valve and switch whereby the hose may rotate without twisting said guided plunger wire, and a spring carried by one of the swivel means to place tension on the guided plunger wire to maintain the latter in taut condition and in operative relation with the valve to avoid lost motion in the handle means.

In testimony whereof I affix my signature.

WILLIAM J. PETER.